US007113949B1

(12) United States Patent
House et al.

(10) Patent No.: US 7,113,949 B1
(45) Date of Patent: Sep. 26, 2006

(54) METHOD AND SYSTEM FOR PRESENTING NETWORK-INFRASTRUCTURE INFORMATION

(75) Inventors: Ron L. House, Stilwell, KS (US); Joe Quint, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 571 days.

(21) Appl. No.: 10/448,715

(22) Filed: May 30, 2003

(51) Int. Cl.
G06F 17/30 (2006.01)
(52) U.S. Cl. .................. 707/10; 707/3; 707/4; 707/5; 707/103 R; 707/104.1
(58) Field of Classification Search .............. 707/100, 707/102, 3, 4, 5, 103 R, 104.1, 10; 709/221; 715/736
See application file for complete search history.

(56) References Cited

U.S. PATENT DOCUMENTS

| 5,671,408 | A  | * | 9/1997  | McBride ................ 707/100 |
| 6,564,209 | B1 | * | 5/2003  | Dempski et al. .......... 707/3  |
| 6,606,744 | B1 | * | 8/2003  | Mikurak .............. 717/174  |
| 6,633,312 | B1 | * | 10/2003 | Rochford et al. ....... 715/736 |
| 6,671,818 | B1 | * | 12/2003 | Mikurak ................ 714/4  |
| 6,721,726 | B1 | * | 4/2004  | Swaminathan et al. ...... 707/3 |
| 6,727,927 | B1 | * | 4/2004  | Dempski et al. ........ 715/853 |
| 6,900,807 | B1 | * | 5/2005  | Liongosari et al. ...... 345/440|
| 6,941,359 | B1 | * | 9/2005  | Beaudoin et al. ........ 709/221|

OTHER PUBLICATIONS

Agilent Technologies;A Natural Choice; Feb. 2002; pp. 1-13; Stuttgart, Germany.
Agilent Technologies; Agilent access Fiber Network Assurance;Feb. 2002; pp. 1-3; Stuttgart, Germany.
Agilent Technologies; Agilent access Fiber Network Operations; Feb. 2002; pp. 1-3; Stuttgart, Germany.
Agilent Technologies; Agilent access Filber Network Planning; Feb. 2002; pp. 1-3; Stuttgart, Germany.
GE Power Systems, News Release- New Smallworld Network Inventory Software from GE Network Solutions Offers Enhanced Capabilities; Dec. 13, 2002; pp. 1,2; Atlanta, GA.
Lucent Technologies; Navis Optical Network Management System (NMS); End-to End Optical Network Layer Management Simplify and Control your Global Network from a Single Seat; 2002; Place (Unknown).
Netest; Questfiber—Remote Fiber Testing for Full Service, Emerging and Next Generation Networks; 2002; pp. 1-13; Utica, NY.
Acterna Communications; Acterna Atlas Remote Fiber Test System Optical Fiber Performance and Monitoring System, Keeping the Network on Target 24 hrs a day; date: (unknown); pp. 1-11; place of publication (unknown).
Acterna the Keepers in Communication; RFTS Remote Fiber Test System; Sep. 2001; pp. 1-9; Richardson, Texas.

* cited by examiner

Primary Examiner—Frantz Coby (57) ABSTRACT

A method, system, and medium for presenting network-infrastructure information in an intuitive, easy-to-understand format is provided. The method includes retrieving data-routing information, retrieving equipment-location information, and then rendering on a map one or more line segments corresponding to the data-routing information and one or more equipment identifiers associated with said equipment-location information. A database is used to generate the map. This database is preferably a database that is also used to track communications pathways and equipment devices so that each map is dynamically generated from current data.

21 Claims, 5 Drawing Sheets

— INDIVIDUAL SEGMENTS (APPROX. 67 SHOWN)
☐ PIECES OF EQUIPMENT (20 SHOWN)

METHOD AND SYSTEM FOR PRESENTING NETWORK-INFRASTRUCTURE INFORMATION

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

This invention relates to the field of computer programming. More particularly, the present invention provides a new and useful method to present in an intuitive format routing information and network-equipment information related to a communications network.

BACKGROUND OF THE INVENTION

Telecommunications networks transmit data through switches and other equipment devices such as routers, splitters, multiplexes, packetizers, signal-transfer points, and the like. Telecommunications networks are in a persistent state of flux. Carriers often add new routes, retire legacy routes, add new equipment, and take old equipment offline. Keeping track of this equipment requires detailed record keeping. Viewing network-infrastructure information related to the routes and equipment can be difficult.

Prior attempts of depicting network data include presenting the data in tabular form using a series of tables. But tables do not provide a readily observable macroscopic snapshot of desired network information. Rather, one must arduously scroll though many rows and columns of data to reach a desired data point. This process must be repeated for each data value to be observed. The current state of the art could be improved by presenting information regarding a telecommunications network and network components in an intuitive, easy-to-understand manner.

Communications networks are complex networks that are composed of a variety of equipment components and communications pathways. Historically, displaying information related to the various equipment devices and communications pathways in an easy-to-understand format has been difficult. For instance, if someone wanted to retrieve information related to the physical routes available on a communications network, that information would be provided in a text or tabular format. But a text or tabular format is not conducive to rapid internalization of data by a user. Because the different network devices and physical data routes of a communications network can possess a wide array of attributes, presenting this information in an intuitive format has been difficult. Accordingly, the state of the art can be improved by providing a method and system that displays physical network-equipment devices and routing information in a more intuitive and easy-to-understand format.

SUMMARY OF THE INVENTION

The present invention solves at least the above problems by providing a system and method for displaying existing and forecasted network-equipped capacity and circuit information. The present invention has several practical applications in the technical arts including depicting on a map telecommunications network infrastructure.

In one aspect, the present invention provides quick access to Dense Wave Division Multiplexing (DWDM) work-build information. The present invention queries a database and displays routing information based on prescribed search criteria such as vendor, model, capacity, and the like.

In another aspect, one or more computer-readable media are provided to display on a map physical fiber routes at street level detail of a carrier's entire network. Quick access is provided to network information such as fiber-cut data, associated DWDM information, and equipment information. This information can be utilized to display existing and forecasted capacity on a line-rate basis, circuit information, visualization, and the like in a more effective manner.

The present invention provides a method and system for presenting an array of information related to the physical devices and routing pathways of a communications network in an easy-to-understand format. In a preferred embodiment, the routing information and equipment information are displayed on a geographical map, such as a map of the United States. On this map are provided segments that correspond to physical routes and equipment markers that correspond to physical equipment devices. The present invention has several practical applications in the technical arts including offering the option of graphically displaying network-infrastructure information in a pictorial format or in the conventional tabular or text format.

In a final aspect of the invention, information related to physical network routes and physical network-equipment devices is stored in a database and associated with equipment markers and segment identifiers. The equipment markers and segment identifiers are graphical components that can be displayed on a geographical map. Incident to a user initiating a query, the present invention dynamically retrieves the respective equipment markers and segment identifiers to provide an accurate representation in graphical format of the data requested. A key aspect of the present invention is that the maps generated are kept up-to-date as the database containing the information related to the physical devices is kept current. That is, as a carrier's network changes, maps that are generated will also be kept up-to-date without additional programming.

BRIEF DESCRIPTION OF THE SEVERAL VIEWS OF THE DRAWINGS

The present invention is described in detail below with reference to the attached drawing figures, wherein.

DETAILED DESCRIPTION OF THE INVENTION

The present invention is a method for providing the option of viewing network information on a map or in text format.

Throughout the disclosure of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention.

Further, various telecom technical terms are used throughout this disclosure. A definition of such terms can be found in *Newton's Telecom Dictionary* by H. Newton, 19th Edition (2003). These definitions are intended to provide a clearer understanding of the ideas disclosed herein but are in no way intended to limit the scope of the present invention. The definitions and terms should be interpreted broadly and liberally to the extent allowed by the art and the meaning of the words offered in the above-cited reference.

As one skilled in the art will appreciate, the present invention may be embodied as, among other things: a method, system, or computer-program product. Accordingly, the present invention may take the form of a hardware embodiment, a software embodiment, or an embodiment combining software and hardware. In a preferred embodiment, the present invention takes the form of a computer-program product that includes computer-useable instructions embodied on a computer-readable medium.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Network-Data Presentation

As previously mentioned, the present invention is, among other things, a computer-program product that includes an application to intuitively display network-infrastructure information related to a communications network. In one embodiment, network-infrastructure information is pictorially displayed on a geographical map, which is easy to interpret by a human viewer. The visual components are preferably hyperlinked to provide additional information if desired while maintaining a clean user interface.

Figure 1:
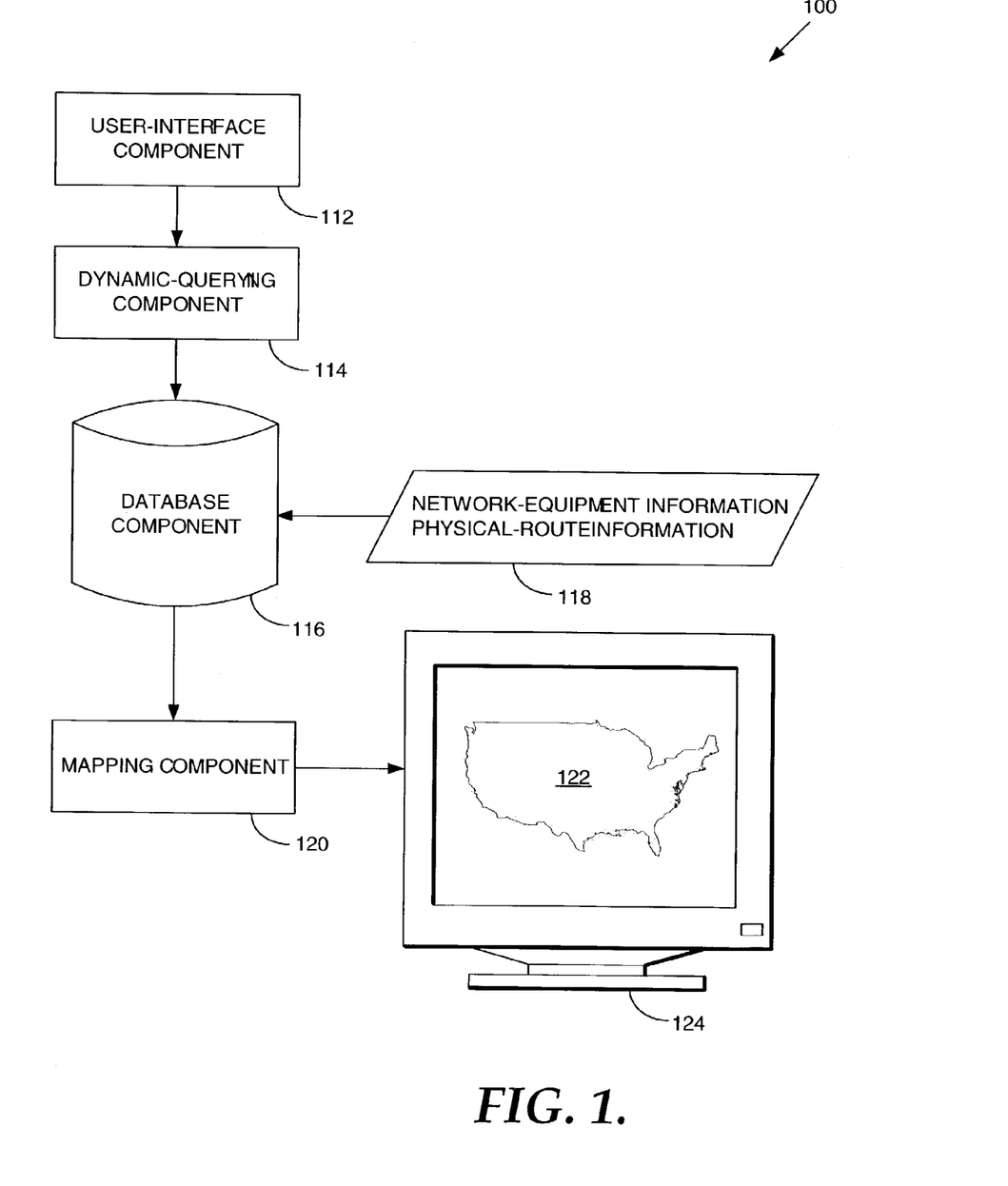
FIG. 1 is a block diagram depicting a suitable operating environment for practicing the present invention.

FIG. 1 represents an exemplary operating environment suitable for practicing the present invention. FIG. 1 is a mere exemplary embodiment of the present invention and should not be construed as limited to the components or the arrangement of the components shown. Those skilled in the art will appreciate various components and subcomponents that are not included for simplicity sake. As shown, the present invention includes a user-interface component 112, a dynamic-querying component 114, a database component 116 and a mapping component 120 to display a map 122 on a display device 124. The database component 116 is populated with network-equipment information and physical-route information which is representatively shown by reference number 118.

User-interface component 112 provides a user-interface to receive one or more requests from a user regarding what information is to be displayed on map 122. In some situations, a user may wish to display all the available types of routes of a certain technology on map 122. In other situations, a user may wish to display various equipment devices that meet some certain criteria. For example, a user may wish to see all routers within a particular geographic area. A user may wish to display equipment by vendor. Although exemplary, embodiments of the present invention are provided with respect to displaying available physical routes, their technologies, and corresponding equipment, the present invention should not be construed as limited to merely displaying routing or equipment information relating to a communications network.

Dynamic-querying component 114 enables real-time querying of database component 116. In one embodiment, it queries database component 116 for information requested by a user through user-interface component 112. Thus dynamic-querying component 114 dynamically queries database 116 to produce a map that is as up-to-date as the database. This arrangement allows the most up-to-date information to be graphically rendered as other systems update database component 116. Although an embodiment of the present invention includes caching or storing query results for rapid display, a new query is preferably run per information-display request.

Mapping component 120 processes the query results to render a map that displays certain segment identifiers 230 and/or equipment markers 226. An exemplary mapping component is Autodesk Mapguide® offered by Autodesk, Inc. of San Rafael, Calif. The mapping component can be configured to display results at varying degrees of resolution, such as by world, continent, country, state, city, neighborhood, and the like.

Figure 2A:
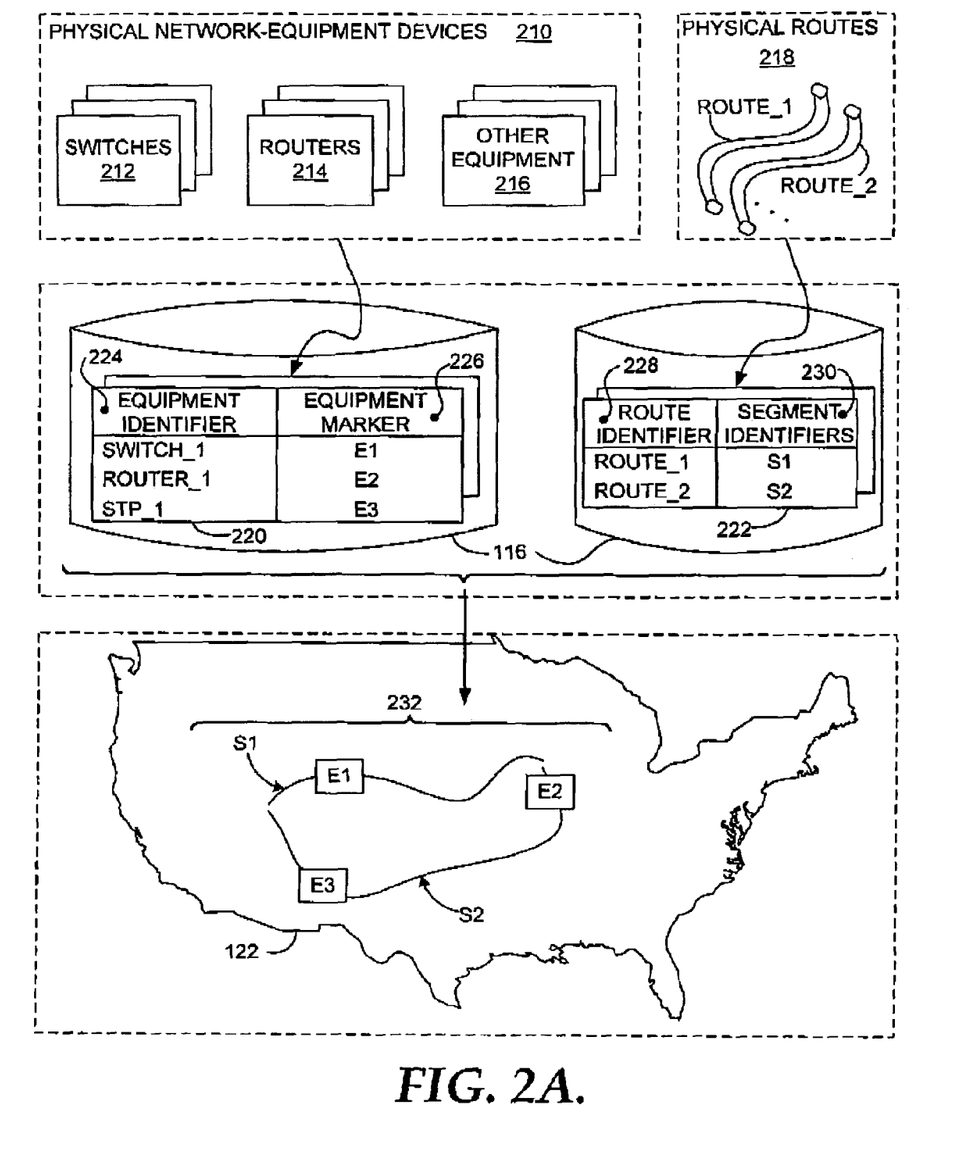
FIG. 2A is a diagram depicting an embodiment of a relationship between physical network devices and routes, their stored attributes, and their presentation on a map.

FIG. 2A is a block diagram providing greater detail of an embodiment of the present invention. Physical network-equipment devices are referenced generally by the numeral 210. Exemplary network-equipment devices include switches 212, routers 214, and other equipment 216. Other equipment 216 is representative of all of the various types of equipment devices that can be found on a communications network. Listing them all here would be impractical, but one with ordinary skill in the art would appreciate that a communications network is composed of hundreds or even thousands of different types of devices that facilitate communication throughout the network. Some exemplary devices include signal-transfer points, multiplexers, demultiplexers, packetizers, depacketizers, repeaters, digitizers, wave generators, pulse generators, and the like.

Two exemplary physical routes 218 are referenced in FIG. 2A as Route_1 and Route_2. These physical routes represent real-world routes that exist on a communications network. For instance, a fiber-optic link may run from Minneapolis to Nevada. This route is considered a physical route, perhaps Route_1. A physical route may exist as a transatlantic route from New York to Spain or span 250 meters from a first residential house to a second. Physical routes 218 are meant to be representative of communications pathways that physically exist within a communications network or networks.

These routes do not need to be operational. Various physical routes 218 may have different operational statuses, for example: active, inactive, in fault, forecasted, or to-be-retired routes. Thus, physical routes 218 should not be construed as limited to merely operational communications pathways. As will be described below, the different operational statuses allow an analyst to quickly view perhaps all available routes of a certain communications type, or all routes that are currently under construction, or all routes that will be built in the next five years.

The information relating to the network-equipment devices 210 is stored in database component 116 in one embodiment. Note with respect to FIG. 2A that although reference numeral 116 points to what appears to be two separate databases, these databases are shown in such a manner for clarity's sake. One skilled in the art would readily appreciate that both tables 220 and 222 can be stored in a single database.

First table 220 associates an equipment identifier 224 with an equipment marker 226. Second table 222 associates a route identifier 228 with a segment identifier 230. The equipment identifiers 224 include indicia that are associated with physical network-equipment devices 210. The equipment markers may be serial numbers for instance. If a carrier has a specific naming convention then that naming convention could be the equipment identifiers 224. Equipment markers 226 are markers that correspond to the equipment identifiers 224 and will be displayed on map 122.

Figure 2B:
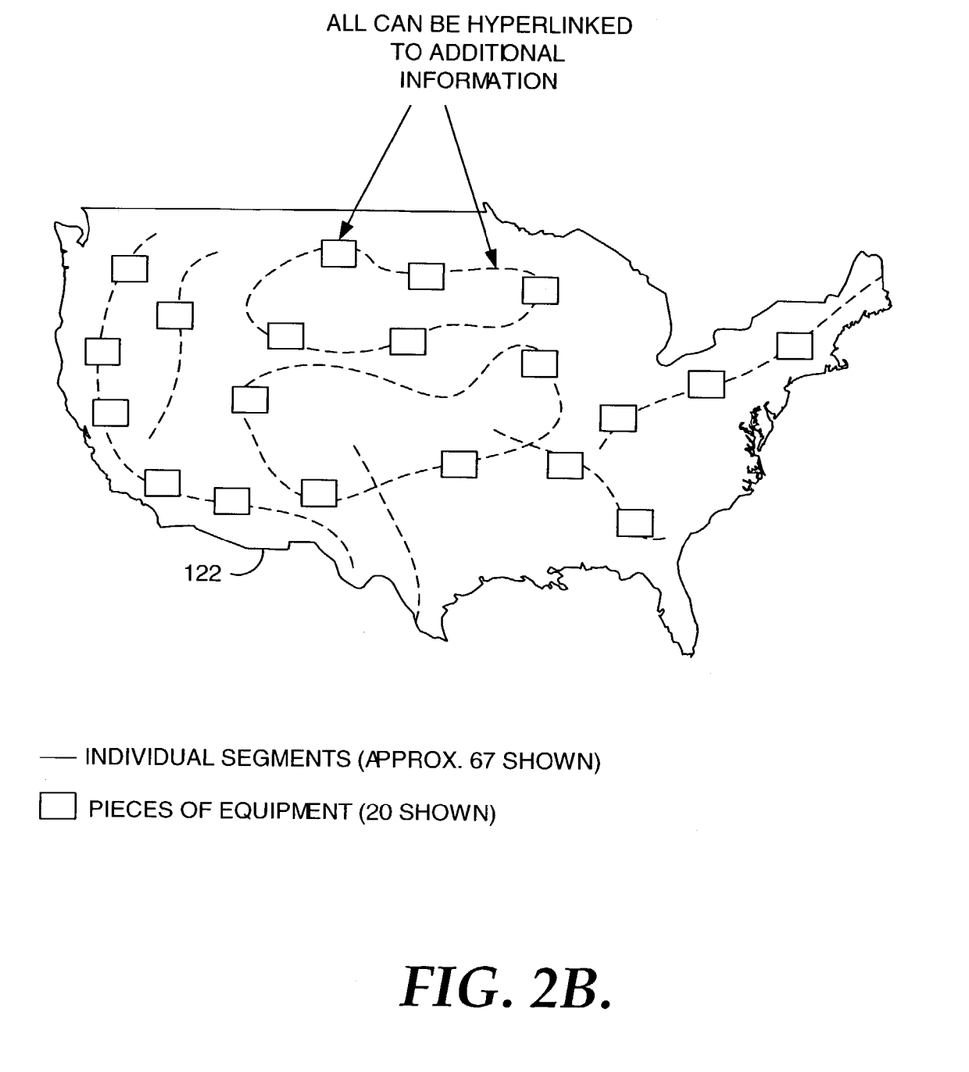
FIG. 2B is an illustrative rendered map depicting several tens of segments and multiple equipment devices associated with one or more networks.

Three equipment markers are shown on FIG. 2A and twenty are shown on FIG. 2B. If a piece of equipment is identified as "Switch_1" then it may have an equipment marker E1 as shown in first table 220. Likewise, equipment device "Router_1" corresponds to equipment marker "E2" in this example and equipment identifier "STP_1" corresponds to equipment marker "E3". Tables 220 and 222 should not be construed as limited to associating the equipment markers with merely one item of data such as "Switch_1" as shown.

The association of equipment markers with the equipment identifiers eases implementing the present invention into existing communications networks. There is no need for a carrier or company to rename its various equipment devices that are its communications network. Rather, equipment markers can simply be associated with whatever identifying indicia are used to denote physical devices on a communications network. It is the equipment markers that will be displayed on map 122 in a preferred embodiment.

Similar to denoting equipment, a carrier may already have in place a scheme for denoting physical routes such as "Route_1" and "Route_2" shown in second table 222. Whatever naming convention a carrier uses to denote its communications pathways can be used with the present invention by associating a segment identifier 230 with the currently implemented route identifier 228. The segment identifiers, such as "S1" and "S2," correspond to physical pathways in the communications network. Segment identifiers 230, like equipment markers 226, are displayable segments that are rendered on map 122. These displayable segments correspond to physical pathways.

As shown on FIG. 2A, an exemplary pictorial illustration 232 is provided that shows segments S1 and S2 along with equipment markers E1, E2, and E3. A more detailed explanation of rendering illustration 232 is provided below. Although FIG. 2A depicts a mere two segments and three pieces of equipment on map 122 for simplicity's sake, FIG. 2B illustrates that a map may display tens, hundreds, or thousands of segments and equipment devices. In a preferred embodiment, these segments and equipment markers are hyperlinked to additional information that is available by clicking on the respective segment or link.

Additional information related to a segment may be presented by following a hyperlink or in some other way (mouse over, hotspot, etc.). This additional information is not limited to: Dense Wave Division Multiplexing (DWDM) information; communications-media information; forecasted-routing information; which of said communications pathways are available to communicate data through said network; optical-fiber information; fiber-cut information; a listing of the availability of said communications pathways; a description of the physical nature of said communications pathways; a description of the bandwidth limitations of said communications pathways; a listing of the physical location of said communications pathways; and/or designation of whether said communications pathways are capable of accommodating a prescribed technology. The aforementioned list is illustrative in nature. A skilled artisan would readily appreciate that any information about routes 228 can be associated with segment identifiers down to the color of the wire if desired. Queries can be performed based on what information is stored.

Dense Wave Division Multiplexing (DWDM) is a technology to use a single channel to efficiently communicate multiple signals. Not all segments of a communications network may be equipped with DWDM capability. In one embodiment of the preferred embodiment, DWDM routes are tracked for easy display on demand.

Figure 2C:
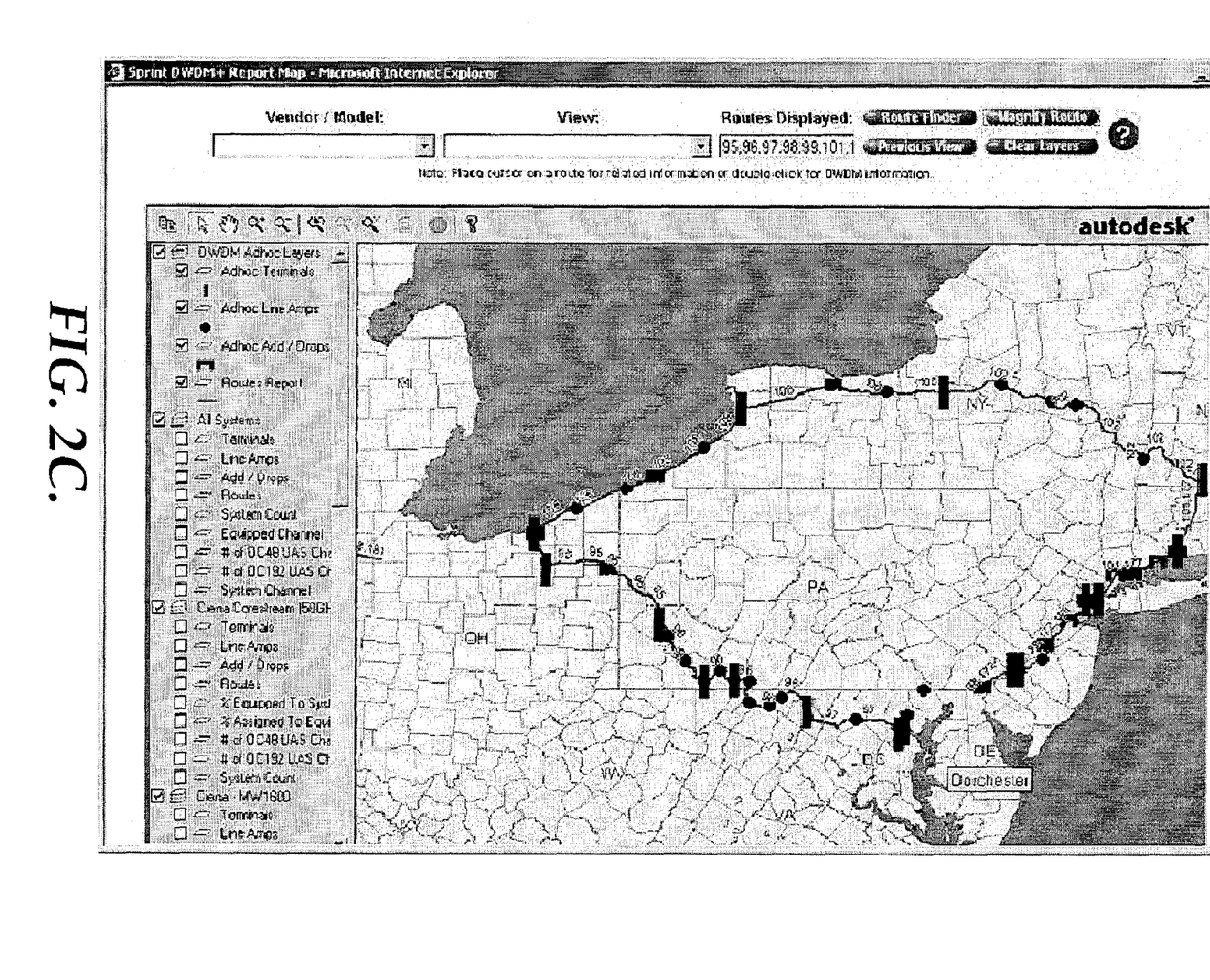
FIG. 2C is an actual map that illustrates an exemplary rendering of the present invention.

Similarly, greater detail of various equipment devices may also be presented, including but not limited to: identifying indicia; information related to the technical capabilities of the respective equipment devices; vendor information; model information; a physical location of the equipment; a listing of technologies offered by the element; a vendor associated with the device; and/or an operational status of the device. An actual map that illustrates portions of the aforementioned functionality is provided in FIG. 2C.

Figure 3:
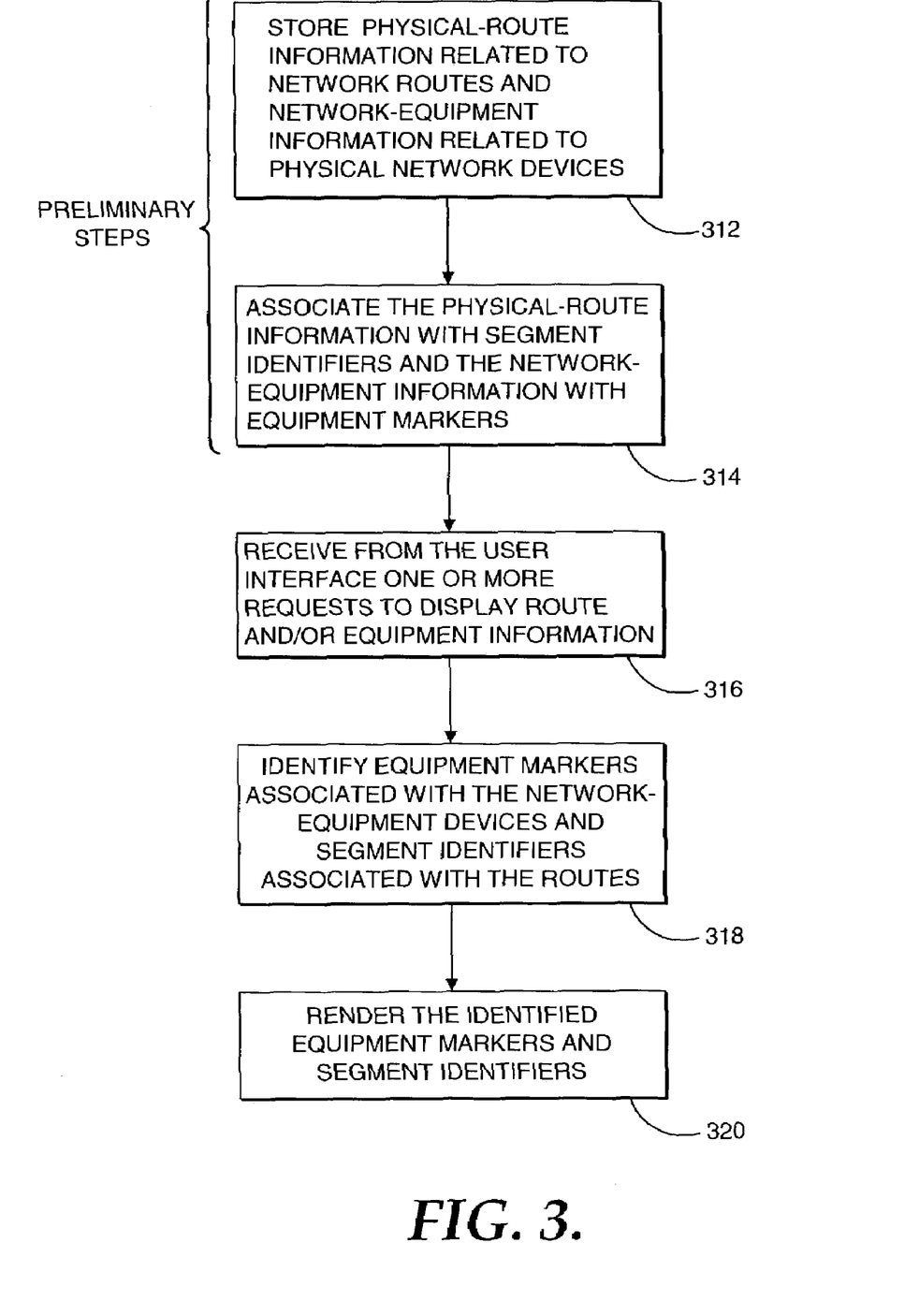
FIG. 3 is an exemplary method of the present invention to render desired information on a map.

FIG. 3 provides an illustrative method of the present invention to render infrastructure diagram 232 on map 122. In one embodiment, two preliminary steps are completed, steps 312 and 314. At step 312, the physical-route information is stored in a first storage device, which can be database component 116. A storage device is well known and conventional in the art. The physical-route information can include any information related to physical routes. As previously mentioned, exemplary physical-route information may include the status of a route, the bandwidth capacities of a route, the route's physical location, different technologies associated with the route, the length of the route, the communication speed of the route, and/or any other information that a vendor wishes to associate with the physical routes 218.

Also at step 312, network-equipment information that is related to the physical network-equipment devices 210 is stored in either the same or other storage devices. The network-equipment information can also be any information related to the various physical network-equipment devices 210. Exemplary network-equipment information may include the vendor that the device is manufactured by and/or the technological capabilities of the physical device as mentioned above.

At step 314 the physical-route information is associated with segment identifiers 230, and the network-equipment information is associated with equipment markers 226. An exemplary embodiment of associating the physical components with displayed identifiers is provided in FIG. 2A by tables 220 and 222. As briefly mentioned above, equipment markers 226 can be associated with an array of information relating to physical network-equipment devices 210.

Equipment markers 226 are preprogrammed to display at certain locations on map 122. Similarly, the segment identifiers 230 are displayable segments that can be turned on and off to render image 232 on map 122. Route identifier "Route_1" is associated with segment S1, which is programmed as a segment to be displayed on map 122. If a user wishes to display Route_1, then segment identifier S1 will be turned on. In one embodiment, different segments are associated with different layers. A first layer may include all the segments of a desired segment range. A second layer may include a different arrangement of segments that are turned on pursuant to a user request.

In a step 316, a request is received from a user interface to display route and/or equipment information. A useful aspect of the present invention is its ability to render equipment markers and segment identifiers dynamically in response to a users query. This is accomplished via dynamic-rendering component 114. Thus, at a step 318 the dynamic-querying component identifies respective equipment markers and segment identifiers that are associated with the physical-equipment devices and routes as requested in step 316. By referencing database component 116, dynamic-querying component 114 can retrieve the equipment markers and segment identifiers that need to be activated and rendered on map 122. At a step 320, the retrieved equipment markers 226 and segment identifiers 230 are rendered. Images can be rendered on a conventional display device as well as a printer or other display component.

As can be seen, the present invention and its equivalents are well adapted to provide a new and useful method for displaying information related to network components. Many different arrangements of the various components depicted, as well as components not shown, are possible without departing from the spirit and scope of the present invention.

The present invention has been described in relation to particular embodiments, which are intended in all respects to be illustrative rather than restrictive. Alternative embodiments will become apparent to those skilled in the art that do not depart from its scope. Many alternative embodiments exist but are not included because of the nature of this invention. A skilled programmer may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A method for presenting telecommunications-network-infrastructure information relating to a communications network having a plurality of equipment devices and communications pathways associated with dense-wave-division-multiplexing (DWDM), said method comprising:
   retrieving physical-route information;
   retrieving equipment-location information;
   rendering on a map one or more line segments corresponding to said physical-route information wherein said line segments contain hyperlinks that, when followed, causes supplementary physical-route information to be presented;
   rendering on said map one or more equipment identifiers associated with said equipment-location information wherein said equipment identifiers contain hyperlinks that, when followed, causes supplementary equipment information to be presented;
   receiving one or more indications of changes to at least one of said physical-route information or said equipment-location information; and,
   dynamically updating said map to reflect said changes.

2. The method of claim 1, wherein said supplementary physical-route information includes one or more selections from the following:
   Dense Wave Division Multiplexing (DWDM) information;
   communications-media information;
   forecasted routing information;
   description of physical nature of said communication pathways;
   description of bandwidth features of said communication pathways;
   which of said communications pathways are available to communicate data through said network;
   listing of physical locations of said communication pathways; and
   designation of whether said communications pathways are capable of accommodating a prescribed technology.

3. The method of claim 2, wherein said communication-media information includes optical-fiber information.

4. The method of claim 3, wherein said optical-fiber information includes information related to a performance status of one or more optical pathways in a communications network including fiber-cut information.

5. The method of claim 1, wherein said supplementary equipment information includes one or more of the following:
   information related to the location of a plurality of network components;
   identifying indicia;
   physical location of the equipment; and
   operational status of the equipment.

6. The method of claim 5, wherein said identifying indicia comprises information related to the technical capabilities of the respective equipment devices, including vendor information and model information.

7. One or more tangible computer-readable media having computer-useable instructions embodied thereon that, when executed, perform the method of claim 1.

8. One or more tangible computer-readable media having computer-useable instructions embodied thereon for performing a method of presenting on a geographical map network-infrastructure information associated with dense wave division multiplexing (DWDM), said method comprising:

receiving a first search-criteria element;
receiving a second search-criteria element;
querying a database based on said first and second search-criteria elements;
receiving from said database a plurality of segment identifiers, wherein said segment identifiers are associated with communications routes that satisfy said first and second search-criteria elements;
receiving from said database a plurality of equipment identifiers, wherein said equipment identifiers are associated with network components that satisfy said first and second search-criteria elements; and
rendering on said map route segments corresponding to said plurality of segment identifiers and equipment markers corresponding to said plurality of equipment identifiers wherein said route segments and equipment markers contain hyperlinks that, when followed, causes supplementary route segment and equipment marker information to be presented;
receiving one or more indications of changes to at least one of said route segments or said equipment markers; and,
dynamically updating said map to reflect said changes.

9. The media of claim 8, wherein receiving a first search-criteria element includes receiving a vendor search string.

10. The media of claim 9, wherein receiving a second search-criteria element includes receiving a view-selection attribute.

11. The media of claim 10, wherein said view-selection attribute includes one or more identifiers that indicate how data is to be rendered on said map.

12. The media of claim 11, wherein querying a database based on said first and second search-criteria elements includes querying a database that associates communications routes with segment identifiers and network components with equipment identifiers.

13. The media of claim 12, wherein rendering said route segments and said equipment markers corresponding to said plurality of equipment identifiers.

14. A network-information rendering system for graphically depicting routing segments and equipment information related to a communications network associated with dense-wave-division-multiplexing (DWDM), comprising:
a user-interface component that receives one or more search-criteria elements related to network information to be depicted;
a database communicatively coupled to said user-interface component that associates
(1) physical-routes information with depictable route segments; and
(2) physical network-equipment information with depictable network-equipment identifiers; and
a map-rendering component communicatively coupled to said database that renders said route segments and said network-equipment identifiers on said user-interface component wherein said route segments and said network-equipment identifiers contain hyperlinks that, when followed, causes supplementary information to be presented;
receiving one or more indications of changes to at least one of said physical-route information or said equipment-location information; and,
dynamically updating said map to reflect said changes.

15. The rendering system of claim 14, wherein said one or more search-criteria elements describe what information is to be displayed on said map-rendering component.

16. The rendering system of claim 15, wherein said physical-routes information includes information related to one or more data-communications pathways of said network.

17. The rendering system of claim 16, wherein information related to one or more data-communications pathways comprises one or more of the following:
a listing of the availability of said communications pathways;
a description of the physical nature of said communications pathways;
a description of the bandwidth features of said communications pathways;
a listing of the physical location of said communications pathways; and
a designation of whether said communications pathways are capable of accommodating a prescribed technology.

18. The rendering system of claim 14, wherein said physical network-equipment information includes one or more of the following:
identifying indicia;
a location of an equipment in said network;
a listing of technologies offered by said element in said network;
a vendor associated with said network; and
an operational-status of said element.

19. A method for presenting network-infrastructure information relating to a plurality of equipment devices and communications pathways associated with dense-wave-division-multiplexing (DWDM), said method comprising:
retrieving physical-route information;
retrieving equipment-location information;
rendering on a map one or more line segments corresponding to said physical-route information wherein said line segments contain hyperlinks that, when followed, causes supplementary physical-route information to be presented;
rendering on said map one or more equipment identifiers associated with said equipment-location information wherein said equipment identifiers contain hyperlinks that, when followed, causes supplementary equipment information to be presented;
receiving one or more indications of changes to at least one of said physical-route information or said equipment-location information; and
dynamically updating said map to reflect said changes.

20. The method of claim 19, wherein said supplementary physical-route information includes one or more selections from the following:
Dense Wave Division Multiplexing (DWDM) information;
communications-media information;
forecasted routing information;
description of physical nature of said communication pathways;
description of bandwidth features of said communication pathways;
which of said communications pathways are available to communicate data through said network;
listing of physical locations of said communication pathways; and
designation of whether said communications pathways are capable of accommodating a prescribed technology.

21. The method of claim 19, wherein said supplementary equipment information includes one or more of the following:
information related to the location of a plurality of network components;
identifying indicia;
physical location of the equipment; and
operational status of the equipment.

* * * * *